US010313469B2

(12) United States Patent
Feng et al.

(10) Patent No.: US 10,313,469 B2
(45) Date of Patent: Jun. 4, 2019

(54) METHOD, APPARATUS AND SYSTEM FOR PROCESSING USER GENERATED CONTENT

(71) Applicant: Tencent Technology (Shenzhen) Company Limited, Shenzhen, Guangdong (CN)

(72) Inventors: Feng Feng, Shenzhen (CN); Yuxun Zhou, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 855 days.

(21) Appl. No.: 14/802,863

(22) Filed: Jul. 17, 2015

(65) Prior Publication Data
US 2015/0326686 A1 Nov. 12, 2015

Related U.S. Application Data

(63) Continuation of application No. PCT/CN2013/088138, filed on Nov. 29, 2013.

(51) Int. Cl.
G06F 15/167 (2006.01)
H04L 29/08 (2006.01)
H04L 12/24 (2006.01)

(52) U.S. Cl.
CPC ...... H04L 67/2842 (2013.01); H04L 41/0896 (2013.01); H04L 67/2847 (2013.01); H04L 67/2852 (2013.01)

(58) Field of Classification Search
CPC ............. H04L 67/2842; H04L 67/2847; H04L 67/2852; H04L 41/0896; G06F 17/30902
(Continued)

(56) References Cited

U.S. PATENT DOCUMENTS 6,360,366 B1* 3/2002 Heath ...................... G06F 8/65
709/201
2001/0051927 A1* 12/2001 London ................ H04L 29/06
705/51
(Continued)

FOREIGN PATENT DOCUMENTS

CN 1969552 A 5/2007
CN 101360109 A 2/2009
(Continued)

OTHER PUBLICATIONS

Tencent Technology, ISRWO, PCT/CN2013/088138, dated Mar. 6, 2014, 10 pgs.
(Continued)

Primary Examiner — Liang Che A Wang
Assistant Examiner — Johnny B Aguiar
(74) Attorney, Agent, or Firm — Morgan, Lewis & Bockius LLP

(57) ABSTRACT

A method, apparatus and system for processing User Generated Content are provided. The method comprises sending a request for obtaining UGC information to a network device; receiving UGC information returned by the network device in response to the request for obtaining UGC information; determining whether UGC in a local cache is the latest UGC based on the UGC information; and downloading UGC from the network device if UGC in the local cache is not the latest UGC.

6 Claims, 3 Drawing Sheets

(58) Field of Classification Search
USPC .................................. 709/203, 212, 217, 219
See application file for complete search history.

(56) References Cited

U.S. PATENT DOCUMENTS

| | | | |
|---|---|---|---|
| 2003/0097564 A1* | 5/2003 | Tewari | H04L 12/14 713/171 |
| 2004/0162885 A1* | 8/2004 | Garg | G06F 17/30575 709/213 |
| 2006/0161585 A1* | 7/2006 | Clarke | G06F 17/2288 |
| 2009/0112935 A1 | 4/2009 | Hefta-Gaub | |
| 2009/0138568 A1* | 5/2009 | Sollicito | G06F 17/30902 709/215 |
| 2010/0161717 A1* | 6/2010 | Albrecht | G06F 17/30902 709/203 |
| 2012/0173485 A1* | 7/2012 | Kothule | G06F 17/30575 707/634 |
| 2014/0201258 A1* | 7/2014 | Jowett | H04W 4/003 709/203 |

FOREIGN PATENT DOCUMENTS

| | | |
|---|---|---|
| CN | 103118122 A | 5/2013 |
| JP | 2012129961 A | 7/2012 |

OTHER PUBLICATIONS

Tencent Technology, IPRP, PCT/CN2013/088138, dated Aug. 25, 2015, 8 pgs.

\* cited by examiner

METHOD, APPARATUS AND SYSTEM FOR PROCESSING USER GENERATED CONTENT

CROSS-REFERENCE TO RELATED APPLICATIONS

This application is a continuation of International Patent Application No. PCT/CN2013/088138, entitled "Method, Apparatus and System for Processing User Generated Content," filed on Nov. 29, 2013 which claims the benefit and priority of Chinese Patent Application No. 201310055676.6, entitled "Method, Apparatus and System for Processing User Generated Content," filed on Feb. 21, 2013. The entire disclosures of each of the above applications are incorporated herein by reference.

TECHNICAL FIELD

The present invention relates to telecommunication, and more particularly, to method, apparatus and system for processing User Generated Content (UGC).

BACKGROUND

The number of internet applications has been increasing rapidly, and QT Audio is one of the widely used internet applications. Users generate significant User Generated Content (UGC) in using QT Audio, such as pictures, videos, and icons. The UGC is normally stored in a backend storage server in the form of images, audio and video. In certain situations, a user may need to access the UGC of someone else, and a request will be sent to the storage server. After receiving the request, the storage server will transmit the requested UGC to the requesting user.

In the prior art, if a user needs to download UGC on a regular basis, or if many users download UGC at the same time, the performance of the storage server and the client will deteriorate, even to the point of bringing the storage server down.

SUMMARY OF THE INVENTION

The embodiments of the present invention provide a method, apparatus and system for processing User Generated Content (UGC) that conserves network bandwidth, reduces demands on storage servers, and enhances the performances of the clients and storage servers.

In accordance with the embodiments of the present invention, a method for processing user generated content (UGC) is provided, the method comprising: sending a request for obtaining UGC information to a network device; receiving UGC information returned by the network device in response to the request for obtaining UGC information; determining whether UGC in a local cache is the latest UGC based on the UGC information; and downloading UGC from the network device if UGC in the local cache is not the latest UGC.

In accordance with the embodiments of the present invention, a method for processing user generated content (UGC) is provided, the method comprising: receiving a request for obtaining UGC information from a client; obtaining UGC information in accordance with the request for obtaining UGC information; sending the UGC information to the client for the client's determining whether UGC in a local cache is the latest UGC by the client; and processing the downloading of the UGC by the client if the client determines the UGC in the local cache is not the latest UGC.

In accordance with the embodiments of the present invention, a client for processing user generated content (UGC) is provided, comprising: a sending unit for sending a request for obtaining UGC information to a network device; a receiving unit for receiving UGC information returned by the network device in response to the request for obtaining UGC information; a determination unit for determining whether UGC in a local cache is the latest UGC based on the UGC information; and a downloading unit for downloading UGC from the network device if the determination unit determines that UGC in the local cache is not the latest UGC.

In accordance with the embodiments of the present invention, a network device for processing user generated content (UGC), comprising: a receiving unit for receiving a request for obtaining UGC information from a client; an acquisition unit for obtaining UGC information in accordance with the request for obtaining UGC information; a sending unit for sending the UGC information to the client for the client's determining whether UGC in a local cache is the latest UGC by the client; and a processing unit for processing the downloading of the UGC by the client if the client determines the UGC in the local cache is not the latest UGC.

In accordance with the embodiments of the present invention, a system for processing UGC is provided, comprising a client and a network device in accordance with embodiments of the present invention.

Preferably, the UGC information comprises a hash value of the UGC. Also preferably, the UGC information further comprises a timestamp of the UGC.

In accordance with the embodiments of the present invention, prior to downloading UCG from a network device, UGC information is first obtained to determine whether UGC in a local cache is the latest UGC, and UGC is downloaded only if it is determined that UGC in the local cache is not the latest UGC, which reduces the need for network bandwidth between the client and the network devices and the amount of downloading. Furthermore, the performance of the client is also enhanced as it does not need to receive large amount of data on a regular basis.

BRIEF DESCRIPTION OF THE DRAWINGS

To better illustrate the technical features of the embodiments of the present invention, various embodiments of the present invention will be briefly described in conjunction with the accompanying drawings. It is obvious that the draws are but for exemplary embodiments of the present invention, and that a person of ordinary skill in the art may derive additional draws without deviating from the principles of the present invention.

DESCRIPTION OF THE PREFERRED EMBODIMENTS

To better illustrate the purpose, technical feature, and advantages of the embodiments of the present invention, various embodiments of the present invention will be further described in conjunction with the accompanying drawings. In the following discussion, the term "client" may refer to, a client terminal device, which includes but is not limited to, a desktop computer, a laptop, a netbook, a tablet, a mobile phone, a multimedia TV and other electronic equipment, or a client side application program.

The embodiments of the present invention provide a method, apparatus and system for processing User Generated Content (UGC).

Embodiment One

Figure 1:
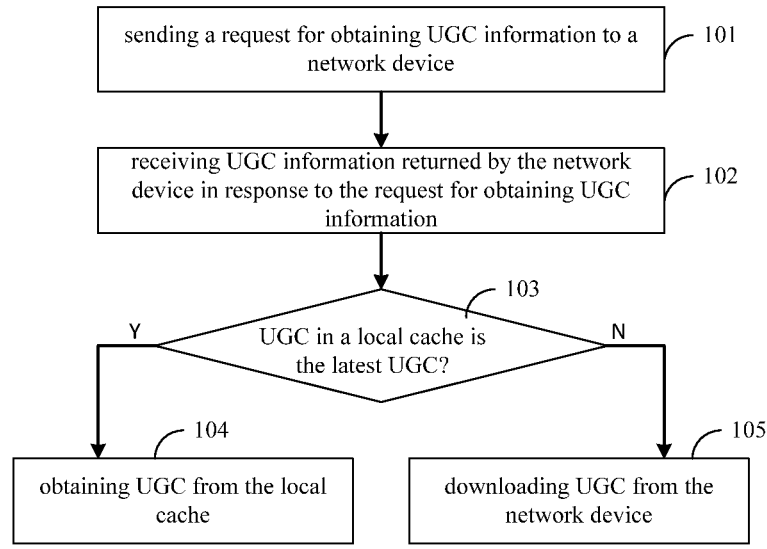
FIG. 1 is an exemplary flowchart for a method for processing User Generated Content in accordance with an embodiment of the present invention.

FIG. 1 is an exemplary flowchart for a method for processing User Generated Content in accordance with an embodiment of the present invention. In this embodiment, the method for processing User Generated Content will be described from the perspective of a client, which can be a mobile phone, a Personal Computer (PC), or a tablet.

The method for processing UGC comprises: sending a request for obtaining UGC information to a network device; receiving UGC information returned by the network device in response to the request for obtaining UGC information; determining whether UGC in a local cache is the latest UGC based on the UGC information; and downloading UGC from the network device if UGC in the local cache is not the latest UGC.

As shown in FIG. 1, the method for processing User Generated Content includes the following steps:

Step 101: sending a request for obtaining UGC information to a network device.

Here, the network device can include an information server and a storage server. The information server stores UGC information, while the storage server stores UGC.

For example, the request for obtaining UGC information can be sent to the information server.

Here, the UGC can be set by on the need of the particular application. For example, the UGC can be pictures, videos, and icons uploaded by the user.

Step 102: receiving UGC information returned by the network device in response to the request for obtaining UGC information.

Here, the UGC information can include a timestamp or a Message Digest Algorithm 5 (MD5) value of the UGC. The UGC information can be set based on the need of the particular application. For simple files, such as image files, the timestamp might be sufficient. For more complex files, such as audio and video files, the UGC information can further include a hash value of the UGC, and MD5 is but one example of a hash value, which can ensure the integrity of the file. Preferably, the UGC information includes both a timestamp and a hash value of the UGC, which would significantly enhance the reliability of the method. Alternative, the timestamp of the UGC can be included in calculating the hash value of the UGC, which enhances the uniqueness of the hash value.

Step 103: determining whether UGC in a local cache is the latest UGC based on the UGC information.

For example, this step can include obtaining UGC information from the local cache, and determining whether the received UGC information is the same as the UGC information from the local cache; and determining that UGC in the local cache is the latest UGC if the received UGC information is the same as the UGC information from the local cache.

Step 104: obtaining UGC from the local cache if UGC in the local cache is the latest UGC.

Step 105: downloading UGC from the network device if UGC in the local cache is not the latest UGC.

For example, the UGC can be downloaded from a storage server, and the step can include sending request for downloading UGC to a storage server, and receiving UGC transmitted by the storage server.

Furthermore, the user can update UGC on the network server from the client, and the method includes: sending a request for updating UGC and UGC information to the network device; and receiving a response from the network device in response to the request for updating UGC.

For example, the client can send a request for updating UGC to the storage server, and upload new UGC to the storage server. The storage server can update the UGC based on the new UGC, and notify the information server to update UGC information. The information server can send the result of the updating to the storage server, and the storage server can send an update response to the client.

In accordance with this embodiments, prior to downloading UCG from a network device, UGC information is first obtained to determine whether UGC in a local cache is the latest UGC, and UGC is downloaded only if it is determined that UGC in the local cache is not the latest UGC, which reduces the need for network bandwidth between the client and the network devices and the amount of downloading. Furthermore, the performance of the client is also enhanced as it does not need to receive large amount of data on a regular basis.

Embodiment Two

Figure 2:
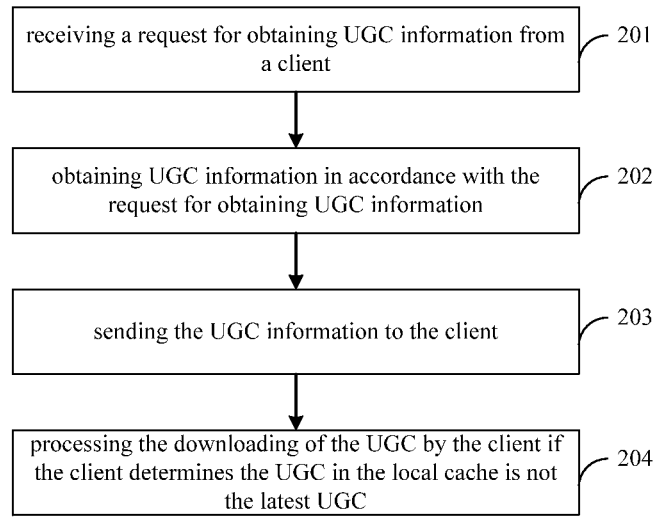
FIG. 2 is an exemplary flowchart for a method for processing User Generated Content in accordance with another embodiment of the present invention.

FIG. 2 is an exemplary flowchart for a method for processing User Generated Content in accordance with another embodiment of the present invention. In this embodiment, the method for processing User Generated Content will be described from the perspective of a network device, which can be a server. For example, the network device can include an information server and a storage server.

The method for processing UGC comprises: receiving a request for obtaining UGC information from a client; obtaining UGC information in accordance with the request for obtaining UGC information; sending the UGC information to the client for the client's determining whether UGC in a local cache is the latest UGC by the client; and processing the downloading of the UGC by the client if the client determines the UGC in the local cache is not the latest UGC.

As shown in FIG. 2, the method for processing User Generated Content includes the following steps:

Step 201: receiving a request for obtaining UGC information from a client.

For example, an information server can receive a request for obtaining UGC information sent by the client.

Here, the client can be a mobile phone, a Personal Computer (PC), or a tablet.

Step 202: obtaining UGC information in accordance with the request for obtaining UGC information.

For example, the information server can obtain UGC information in accordance with the request for obtaining UGC information.

The UGC information can be set based on the need of the particular application. For example, the UGC information can include a timestamp and MD5 of the UGC.

Step 203: sending the UGC information to the client for the client's determining whether UGC in a local cache is the latest UGC by the client.

For example, the information server can send UGC information to the client.

Thus, after receiving the UGC information, the client can determine whether UGC in the local cache is the latest UGC in accordance with the UGC information. If the UGC in the local cache is the latest UGC, then the client obtains the UGC from the local cache; if the UGC in the local cache is not the lasted UGC, then the client downloads the UGC from the network devices, such as from a storage server.

In this step, the client's determining whether UGC in a local cache is the latest UGC further comprises the following steps: obtaining UGC information from the local cache; determining whether the received UGC information is the same as the UGC information from the local cache; and determining that UGC in the local cache is the latest UGC if the received UGC information is the same as the UGC information from the local cache.

In this step, the UGC can be set by on the need of the particular application. For example, the UGC can be pictures, videos, and icons uploaded by the user.

Step 204: processing the downloading of the UGC by the client if the client determines the UGC in the local cache is not the latest UGC.

For example, after the client determines that UGC in a local cache is not the latest UGC, the storage server receives a request to download UGC from the client, and transmits UGC to the client in accordance with the request to download UGC.

Furthermore, the network device can update UGC based on a request from the client, and the method includes: receiving a request for updating UGC from the client; and updating UGC in response to the request for updating UGC.

For example, the storage server can receive a request for updating UGC from the client, receive new UGC uploaded by the client, update the UGC based on the new UGC, notify the information server to update UGC information, receive result of updating from the information server, and send an update response to the client.

In accordance with this embodiments, prior to downloading UCG from a network device, the network device first receives a request for obtaining UGC information from a client, then obtains UGC information in accordance with the request for obtaining UGC information and sends the UGC information to the client, so that the client can determine whether UGC in a local cache is the latest UGC, and UGC is downloaded only if it is determined that UGC in the local cache is not the latest UGC, which reduces the need for network bandwidth between the client and the network devices and the amount of downloading. Furthermore, the performance of the client is also enhanced as it does not need to receive large amount of data on a regular basis.

Embodiment Three

The methods in Embodiment One and Embodiment Two will be further illustrated below.

In this Embodiment, the network device includes an information server and a storage server.

The information server stores UGC information, while the storage server stores UGC. When a user updates the UGC in the storage server, the storage server notifies the information server to update the corresponding UGC information.

Figure 3:
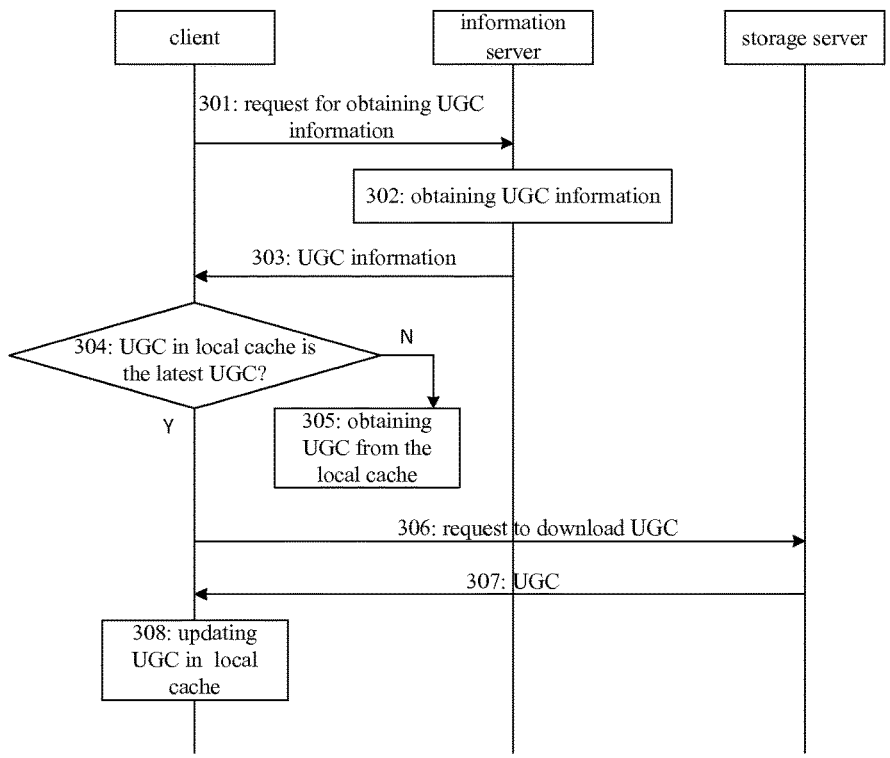
FIG. 3 is an exemplary flowchart for a method for processing User Generated Content in accordance with yet another embodiment of the present invention.

FIG. 3 is an exemplary flowchart for a method for processing User Generated Content in accordance with yet another embodiment of the present invention. As shown in FIG. 3, the method for obtaining UGC includes the following steps:

Step 301: the client sending a request for obtaining UGC information to an information server.

Step 302: after receiving the request for obtaining UGC information, the information server obtaining UGC information in accordance with the request for obtaining UGC information.

Here, the UGC information can include a timestamp and MD5 of the UGC.

Step 303: the information server sending UGC information to the client.

Step 304: after receiving UGC information, the client determining whether UGC in local cache is the latest UGC based on the UGC information. If UGC in a local cache is the latest UGC, proceed to Step 305; otherwise, proceed to step 306.

For example, the client can obtain UGC information from the local cache, and determining whether the received UGC information is the same as the UGC information from the local cache. The client determines that UGC in the local cache is the latest UGC if the received UGC information is the same as the UGC information from the local cache.

Here, the UGC can be pictures, videos, and icons uploaded by the user.

Step 305: the client obtaining UGC from the local cache if UGC in the local cache is the latest UGC.

For example, the client can obtain pictures, videos, and icons uploaded by the user from the local cache.

Step 306: the client sending a request to download UGC to the storage server if UGC in the local cache is not the latest UGC.

Step 307: after receiving the request to download UGC, the storage server sending the requested UGC to the client.

For example, the storage server can send pictures, videos, and icons responsive to the request to download UGC to the client.

308: the client receiving UGC sent by the storage server, and updating UGC and UGC information in the local cache.

For convenience, the above process in this embodiment is referred to as the UGC acquisition process. In another words, the method of processing UGC in accordance with embodiments of the present invention can include UGC acquisition process and UGC update process (to be discussed in Embodiment Four below).

In accordance with this embodiments, prior to downloading UCG from a network device, UGC information is first obtained to determine whether UGC in a local cache is the latest UGC, and UGC is downloaded only if it is determined that UGC in the local cache is not the latest UGC, which reduces the need for network bandwidth between the client and the network devices and the amount of downloading. Furthermore, the performance of the client is also enhanced as it does not need to receive large amount of data on a regular basis.

Embodiment Four

Figure 4:
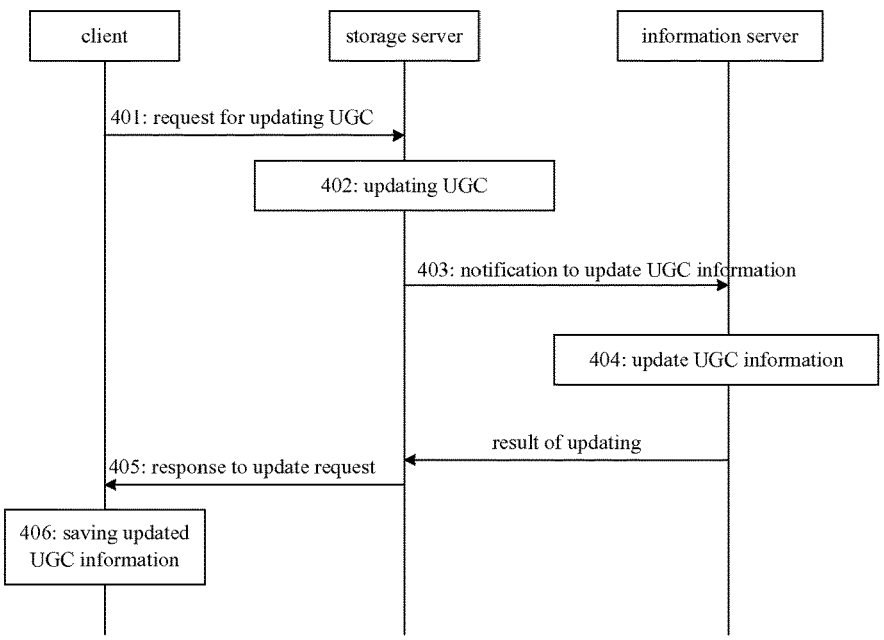
FIG. 4 is an exemplary flowchart for a method for processing User Generated Content in accordance with yet another embodiment of the present invention.

On the basis of Embodiment Three, a user can also update UGC on the storage server through the client. In another words, the method of processing UGC can further include an UGC update process. FIG. 4 is an exemplary flowchart for a method for processing User Generated Content in accordance with yet another embodiment of the present invention. As shown in FIG. 4, the update process includes the following steps:

Step 401: the client sending a request for updating UGC to the storage server.

Step 402: after receiving the request for updating UGC from the client, the storage server updating UGC in accordance to the request for updating UGC.

The UGC can be pictures, videos, and icons uploaded by the user.

Step 403: For example, the storage server sending a notification to the information server to update UGC information, Step 404: the information server update UGC information, and send result of updating to the storage server.

The UGC information can include the timestamp and MD5 of the UGC, and the notification is for the information server to update the timestamp and MD5 of the UGC.

The result of updating can include the updated UGC information, such as the timestamp and MD5 of the updated UGC.

Step 405: storage server sending a response to update request to the client.

The response to update request can include the updated UGC information, such as the timestamp and MD5 of the updated UGC.

Step 406: the client receiving the response to update request, saving updated UGC information to the local cache, such as the timestamp and MD5 of the updated UGC, for later use.

It should be noted that the update process can be performed prior to or after the UGC acquisition process. For example, the update process can be performed prior to the step of the client sending a request for obtaining UGC information to the network device, or after the UGC acquisition process.

In sum, in accordance with this embodiment, UGC on the storage server and UGC information on the information server can be updated by the client, which ensures that data on the storage server and information server will be timely updated to enhance user experience.

Embodiment Five

Figure 5:
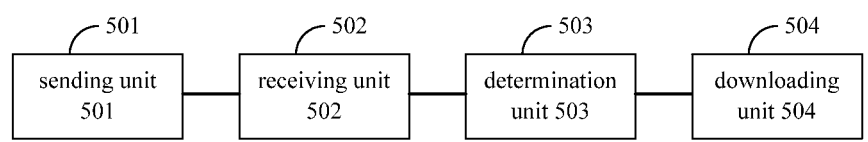
FIG. 5 is an exemplary schematic diagram for a client in accordance with yet another embodiment of the present invention.

In accordance with this embodiment of the present invention, an apparatus for processing UGC is provided, which can be used as a client in this embodiment. FIG. 5 is an exemplary schematic diagram for a client in accordance with yet another embodiment of the present invention. As shown in FIG. 5, the client includes a sending unit 501; a receiving unit 502; a determination unit 503; and a downloading unit 504.

The sending unit 501 is used for sending a request for obtaining UGC information to a network device.

Here, the network device can include an information server and a storage server. The information server stores UGC information, while the storage server stores UGC.

For example, the sending unit 501 can send the request for obtaining UGC information to the information server.

Here, the UGC can be set by on the need of the particular application. For example, the UGC can be pictures, videos, and icons uploaded by the user.

The receiving unit 502 is used for receiving UGC information returned by the network device in response to the request for obtaining UGC information.

Here, the UGC information can include a timestamp and MD5 of the UGC.

The determination unit 503 is used for determining whether UGC in a local cache is the latest UGC based on the UGC information received by the receiving unit 502.

For example, determination unit 503 can obtain UGC information from the local cache, and determine whether the received UGC information is the same as the UGC information from the local cache. The determination unit 503 determines that UGC in the local cache is the latest UGC if the received UGC information is the same as the UGC information from the local cache.

The downloading unit 504 is used for downloading UGC from the network device if the determination unit 503 determines that UGC in the local cache is not the latest UGC.

For example, downloading unit 504 can download UGC from a storage server, such as sending a request for downloading UGC to a storage server, and receiving UGC transmitted by the storage server.

Furthermore, the user can update UGC on the network server from the client. The sending unit 501 is further used for sending a request for updating UGC to the network device; and the receiving unit 502 is further used for receiving a response from the network device in response to the request for updating UGC.

For example, the sending unit 501 can send a request for updating UGC to the storage server, and upload new UGC to the storage server. The storage server can update the UGC based on the new UGC, and notify the information server to update UGC information. The information server can send the result of the updating to the storage server, and the storage server can send an update response to the receiving unit 502.

It should be noted that, in the above descriptions, the various modules in the apparatus for processing UGC are merely exemplary examples used to illustrate the embodiments of the present invention by way of examples. In practice, the various functions can be allocated to different modules based on need, and the apparatus can be divided into different modules to perform the whole or part of the functions described above. In addition, the method embodiments above can be referenced for the implementation of the apparatus for processing UGC in this embodiment.

Here, the client can be a mobile phone, a Personal Computer (PC), or a tablet.

In accordance with this embodiments, prior to downloading UCG from a network device, UGC information is first obtained by receiving unit 501 for the determination unit 503 to determine whether UGC in a local cache is the latest UGC, and UGC is downloaded by the downloading unit 504 only if it is determined that UGC in the local cache is not the latest UGC, which reduces the need for network bandwidth between the client and the network devices and the amount of downloading. Furthermore, the performance of the client is also enhanced as it does not need to receive large amount of data on a regular basis.

Embodiment Six

Figure 6:
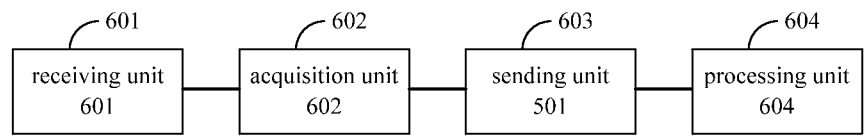
FIG. 6 is an exemplary schematic diagram for a network device in accordance with yet another embodiment of the present invention.

In accordance with this embodiment of the present invention, an apparatus for processing UGC is provided, which can be used as a network device in this embodiment. FIG. 6 is an exemplary schematic diagram for a network device in accordance with yet another embodiment of the present invention. As shown in FIG. 6, the network device includes a receiving unit 601; an acquisition unit 602; a sending unit 603; and a processing unit 604.

The receiving unit 601 is used for receiving a request for obtaining UGC information from a client.

Here, the client can be a mobile phone, a Personal Computer (PC), or a tablet.

The acquisition unit 602 is used for obtaining UGC information in accordance with the request for obtaining UGC information.

The UGC information can be set based on the need of the particular application. For example, the UGC information can include a timestamp and MD5 of the UGC.

The sending unit 603 is used for sending the UGC information to the client for the client's determining whether UGC in a local cache is the latest UGC by the client.

If the UGC in the local cache is the latest UGC, then the client obtains the UGC from the local cache; if the UGC in the local cache is not the lasted UGC, then the client downloads the UGC from the network devices, such as from a storage server.

The processing unit 604 is used for processing the downloading of the UGC by the client if the client determines the UGC in the local cache is not the latest UGC.

Furthermore, the network device can update UGC based on a request from the client, and the network device can further include an update unit. The receiving unit 601 is further used for receiving a request for updating UGC from the client; the update unit is used for updating UGC and UGC information in response to the request for updating UGC received by the receiving unit 601; and the sending unit 603 is further used for sending an update response to the client.

Here, the update response can include the updated UGC information, such as the timestamp and MD5 of the updated UGC.

It should be noted that, in the above descriptions, the various modules in the apparatus for processing UGC are merely exemplary examples used to illustrate the embodiments of the present invention by way of examples. In practice, the various functions can be allocated to different modules based on need, and the apparatus can be divided into different modules to perform the whole or part of the functions described above. For example, the network device can be a server, such as an information server or a storage server.

In accordance with this embodiments, prior to downloading UCG from a network device, the receiving unit 601 of the network device first receives a request for obtaining UGC information from a client, the acquisition unit 602 obtains UGC information in accordance with the request for obtaining UGC information, the sending unit 603 sends the UGC information to the client, so that the client can determine whether UGC in a local cache is the latest UGC, and UGC is downloaded only if it is determined that UGC in the local cache is not the latest UGC, which reduces the need for network bandwidth between the client and the network devices and the amount of downloading. Furthermore, the performance of the client is also enhanced as it does not need to receive large amount of data on a regular basis.

Embodiment Seven

In accordance with this embodiment of the present invention, a system for processing UGC is provided, which can include any client in Embodiment Five and any network device in Embodiment Six. The system for processing UGC includes:

A client for sending a request for obtaining UGC information to a network device; receiving UGC information returned by the network device in response to the request for obtaining UGC information; determining whether UGC in a local cache is the latest UGC based on the UGC information; and downloading UGC from the network device if UGC in the local cache is not the latest UGC.

A network device for receiving a request for obtaining UGC information from a client; obtaining UGC information in accordance with the request for obtaining UGC information; sending the UGC information to the client for the client's determining whether UGC in a local cache is the latest UGC by the client; and processing the downloading of the UGC by the client if the client determines the UGC in the local cache is not the latest UGC.

Here, the UGC the UGC can be pictures, videos, and icons uploaded by the user. The UGC information can include a timestamp or MD5 of the UGC.

The client can obtain UGC information from the local cache, and determine whether the received UGC information is the same as the UGC information from the local cache; and determine that UGC in the local cache is the latest UGC if the received UGC information is the same as the UGC information from the local cache.

Furthermore, the user can update UGC on the network server from the client. The client is further used for sending a request for updating UGC to the network device; and for receiving a response from the network device in response to the request for updating UGC. The network device is further used for receiving a request for updating UGC from the client; updating UGC and UGC information in response to the request for updating UGC; and sending an update response to the client.

The network device can include an information server and a storage server. The information server stores UGC information, while the storage server stores UGC. Thus, the system for processing UGC includes: a client for sending a request for obtaining UGC information to a network device; receiving UGC information returned by the network device in response to the request for obtaining UGC information; determining whether UGC in a local cache is the latest UGC based on the UGC information; and downloading UGC from the network device if UGC in the local cache is not the latest UGC; an information server for receiving a request for obtaining UGC information from a client; obtaining UGC information in accordance with the request for obtaining UGC information; sending the UGC information to the client, and for the client's determining whether UGC in a local cache is the latest UGC by the client; and an storage server for processing the downloading of the UGC by the client if the client determines the UGC in the local cache is not the latest UGC.

The client can further be used for sending a request for updating UGC to the storage server; uploading UGC to the storage server, and receiving an update response from the storage server.

The storage server can further be used for receiving a request for updating UGC from the client, receiving new UGC uploaded by the client, updating UGC using new UGC, notifying information server to update UGC information, receiving the result of updating from the information server, and sending an update response to the client.

The information server can be further used for updating UGC information upon receiving a notification from the storage server, and sending the result of updating to the storage server.

In accordance with this embodiments, prior to downloading UCG from a network device, UGC information is first obtained to determine whether UGC in a local cache is the latest UGC, and UGC is downloaded only if it is determined that UGC in the local cache is not the latest UGC, which reduces the need for network bandwidth between the client and the network devices and the amount of downloading. Furthermore, the performance of the client is also enhanced as it does not need to receive large amount of data on a regular basis.

Those skilled in the art will understand that all or part of the embodiments of the present invention can be implemented by computer hardware, or by a computer program controlling the relevant hardware. The computer program can be stored in a computer readable storage media, which can be read-only memory, magnetic disk or optical disk, etc.

The various embodiments of the present invention are merely preferred embodiments, and are not intended to limit the scope of the present invention, which includes any modification, equivalent, or improvement that does not depart from the spirit and principles of the present invention.

The invention claimed is:

1. A method for processing user generated content (UGC) associated with a user of a social networking application, the method comprising:

at a client device with a local cache:
sending a first request for UGC information to an information server, wherein respective UGC information stored at the information server is associated with respective UGC stored at a storage server that is distinct from the information server;
receiving first UGC information from the information server in response to the first request for UGC information;
determining whether local UGC in the local cache is latest UGC based on the first UGC information received from the information server, further comprising:
obtaining second UGC information from the local cache as the local UGC; and
comparing the second UGC information with the first UGC information;
in accordance with a determination that the first UGC information differs from the second UGC information,
sending a request for fresher UGC to the storage server,
downloading the fresher UGC from the storage server, and
updating the local UGC and corresponding UGC information in the local cache with the fresher UGC and the first UGC information, wherein the first UGC information comprises a hash value of the fresher UGC calculated using a timestamp of the fresher UGC; and
after downloading the fresher UGC from the storage server:
receiving new UGC from the user of the social networking application and storing the new UGC in the local cache;
sending a second request for updating UGC to the storage server, wherein the second request includes the new UGC to be uploaded to the storage server, and wherein the storage server updates the fresher UGC with the new UGC and causes the information server to update the first UGC information stored at the information server and provide the updated first UGC information to the storage server;
receiving a response from the storage server after sending the second request for updating UGC, the response including the updated first UGC information; and
replacing the first UGC information in the local cache with the updated first UGC information.

2. The method of claim 1, wherein the first UGC information further comprises the timestamp of the fresher UGC.

3. An electronic device for processing user generated content (UGC) associated with a user of a social networking application, the electronic device comprising:

one or more processors;
a local cache; and
memory storing one or more programs for execution by the one or more processors, the one or more programs including instructions for:
sending a first request for UGC information to an information server, wherein respective UGC information stored at the information server is associated with respective UGC stored at a storage server that is distinct from the information server;
receiving first UGC information from the information server in response to the first request for UGC information;
determining whether local UGC in the local cache is latest UGC based on the first UGC information received from the information server, further comprising:
obtaining second UGC information from the local cache as the local UGC; and
comparing the second UGC information with the first UGC information;
in accordance with a determination that the first UGC information differs from the second UGC information,
sending a request for fresher UGC to the storage server,
downloading the fresher UGC from the storage server, and
updating the local UGC and corresponding UGC information in the local cache with the fresher UGC and the first UGC information, wherein the first UGC information comprises a hash value of the fresher UGC calculated using a timestamp of the fresher UGC; and
after downloading the fresher UGC from the storage server:
receiving new UGC from the user of the social networking application and storing the new UGC in the local cache;
sending a second request for updating UGC to the storage server, wherein the second request includes the new UGC to be uploaded to the storage server, and wherein the storage server updates the fresher UGC with the new UGC and causes the information server to update the first UGC information stored at the information server and provide the updated first UGC information to the storage server;
receiving a response from the storage server after sending the second request for updating UGC, the response including the updated first UGC information; and replacing the first UGC information in the local cache with the updated first UGC information.

4. The electronic device of claim 3, wherein the first UGC information further comprises the timestamp of the fresher UGC.

5. A non-transitory computer-readable storage medium, storing one or more programs configured for execution by one or more processors of an electronic device with a local cache for processing user generated content (UGC) associated with a user of a social networking application, the one or more programs including instructions, which when executed by the one or more processors cause the electronic device to:
   send a first request for UGC information to an information server, wherein respective UGC information stored at the information server is associated with respective UGC stored at a storage server that is distinct from the information server;
   receive first UGC information from the information server in response to the first request for UGC information;
   determine whether local UGC in the local cache is latest UGC based on the first UGC information received from the information server, further comprising:
      obtaining second UGC information from the local cache as the local UGC; and
      comparing the second UGC information with the first UGC information;
   in accordance with a determination that the first UGC information differs from the second UGC information, send a request for fresher UGC to the storage server, download the fresher UGC from the storage server, and update the local UGC and corresponding UGC information in the local cache with the fresher UGC and the first UGC information, wherein the first UGC information comprises a hash value of the fresher UGC calculated using a timestamp of the fresher UGC; and
   after downloading the fresher UGC from the storage server:
      receive new UGC from the user of the social networking application and storing the new UGC in the local cache;
      send a second request for updating UGC to the storage server, wherein the second request includes the new UGC to be uploaded to the storage server, and wherein the storage server updates the fresher UGC with the new UGC and causes the information server to update the first UGC information stored at the information server and provide the updated first UGC information to the storage server;
      receive a response from the storage server after sending the second request for updating UGC, the response including the updated first UGC information; and
      replace the first UGC information in the local cache with the updated first UGC information.

6. The non-transitory computer-readable storage medium of claim 5, wherein the first UGC information further comprises the timestamp of the fresher UGC.

* * * * *